April 25, 1933.  H. RESCH  1,905,305
COMBINED TYPEWRITING AND COMPUTING MACHINE
Filed April 27, 1928   3 Sheets-Sheet 1
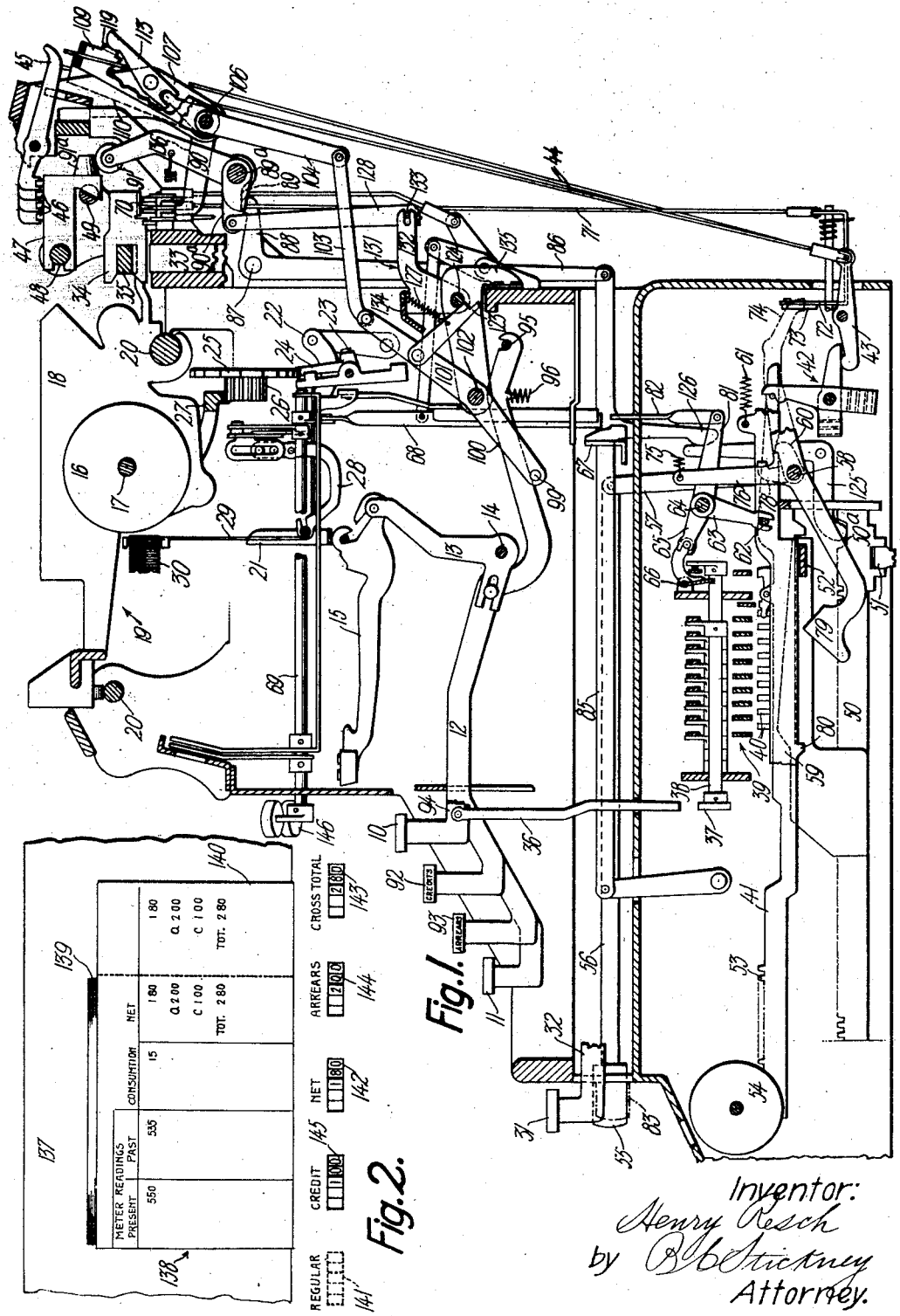
Inventor:
Henry Resch
by B.B.Stickney
Attorney.

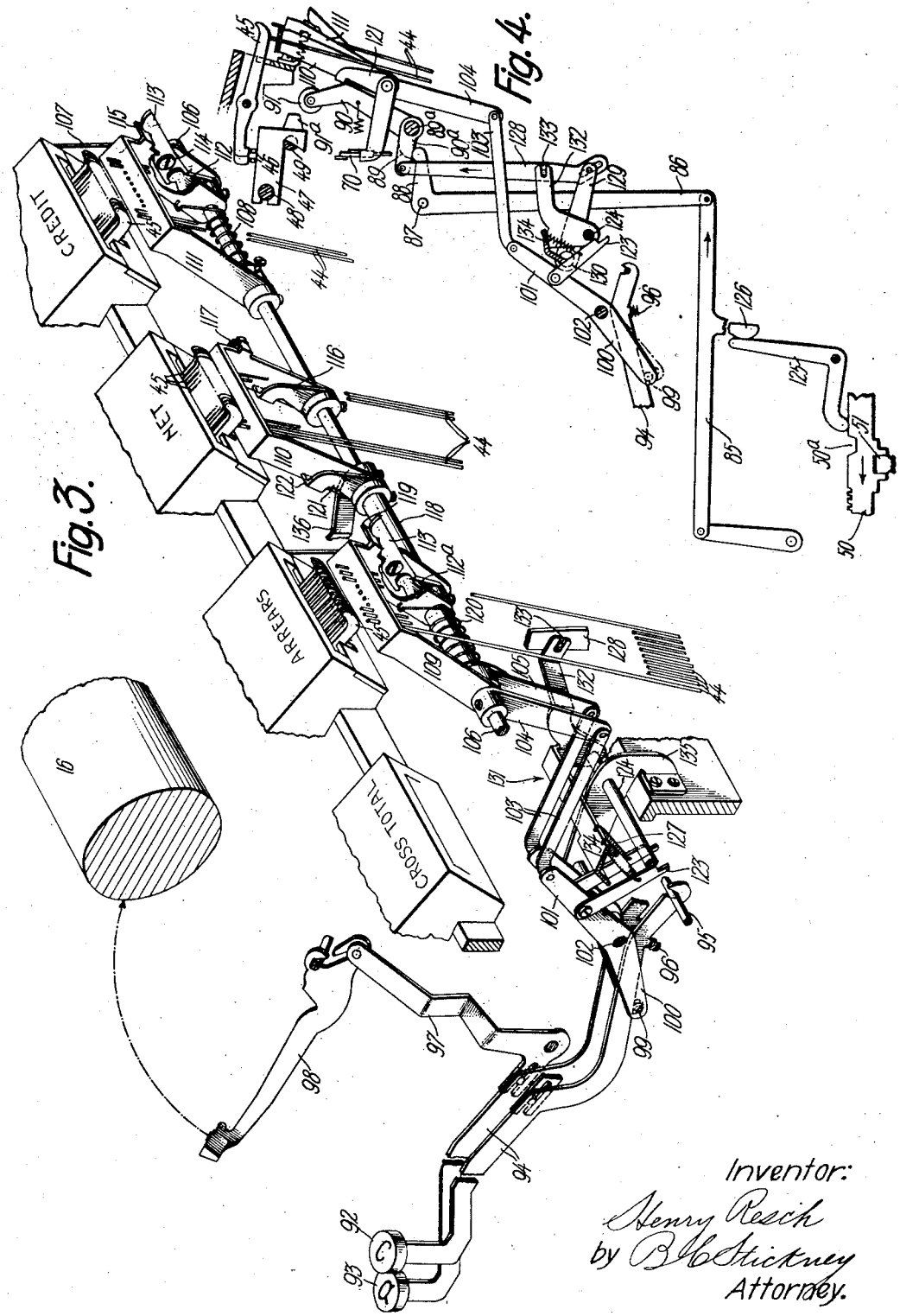

April 25, 1933.  H. RESCH  1,905,305
COMBINED TYPEWRITING AND COMPUTING MACHINE
Filed April 27, 1928   3 Sheets-Sheet 3
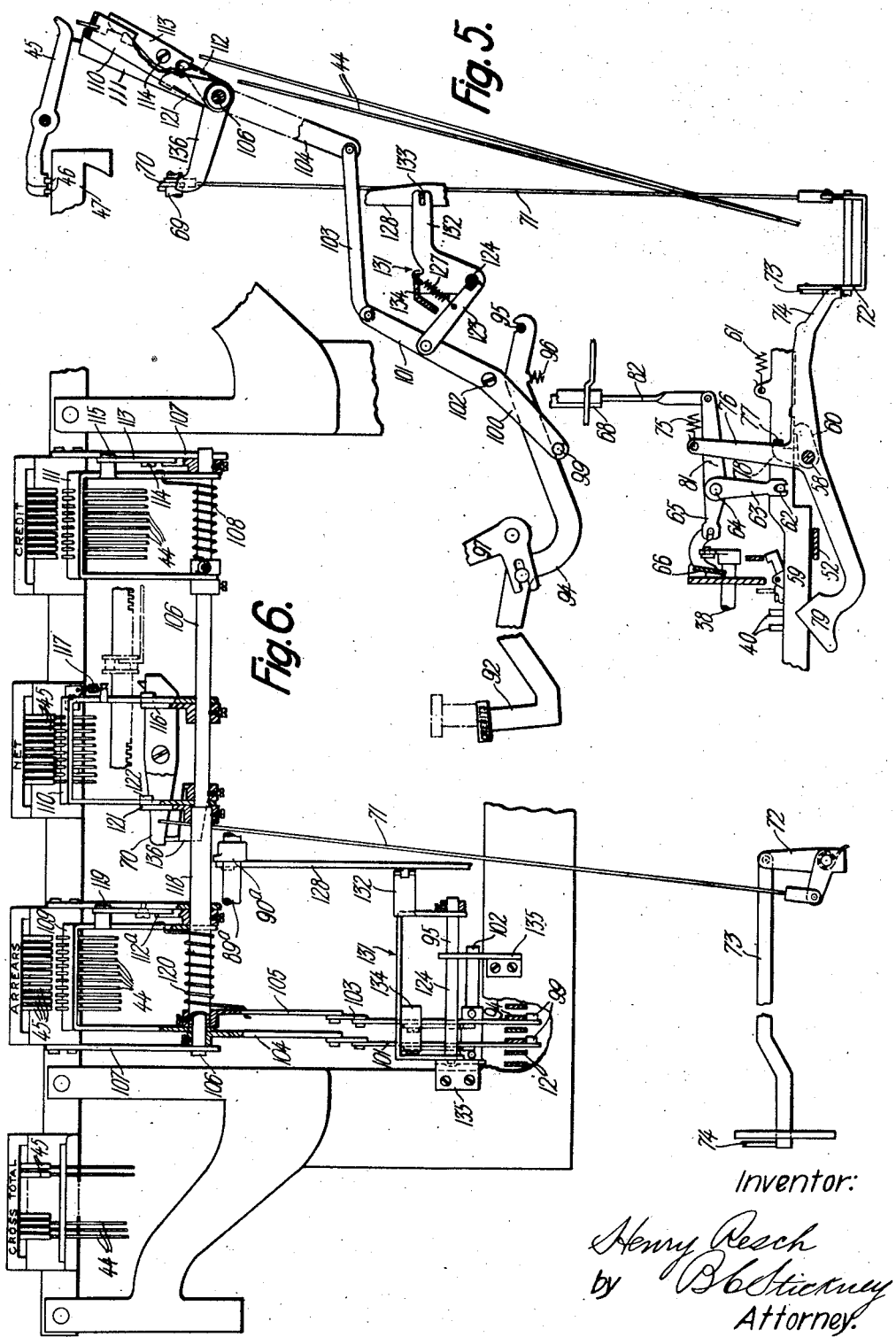
Inventor:
Henry Resch
by B. C. Stickney
Attorney.

Patented Apr. 25, 1933

1,905,305

UNITED STATES PATENT OFFICE

HENRY RESCH, OF BAYONNE, NEW JERSEY, ASSIGNOR TO UNDERWOOD ELLIOTT FISHER COMPANY, OF NEW YORK, N. Y., A CORPORATION OF DELAWARE

COMBINED TYPEWRITING AND COMPUTING MACHINE

Application filed April 27, 1928. Serial No. 273,178.

This invention relates to combined typewriting and computing machines, and more specifically to the control of the registers employed in the Underwood-Hanson machine, whereby the dissimilar computing items may be tabulated in a single column and be automatically and selectively distributed to one or more designated registers.

Heretofore the typing of a complete transaction as a single-line entry that includes a succession of related computations to produce a net result, and which computations are selectively entered into corresponding registors, required the depression of elimination and state-control keys to properly distribute the items to their respective registers, which was a tax upon the operator to avoid mistakes. Furthermore the typing of these successive items as a single-line entry sometimes required a very wide work-sheet.

Some forms of bill-rendering like public utility post-cards require that arrears, credits, meter-readings and cross-totals, be read from registers, and the typing thereof renders a self-explanatory net account to be mailed to the consumer.

The typing of each amount in the same column sets up computing conditions for all the registers, and the operator must individually eliminate those registers in which computation of a typed item is not desired. If the amount is a credit item a subtractive state is set up for all the registers, which must be wiped out to prevent the item being carried into any other register except the credit register.

A feature of the present invention provides that a plurality of successive computive items may be tabulated in a single vertical column and run into dissimilar registers to shorten the overall width of the work-sheet to a post-card dimension, a dimension equal to the combined width of these column-items less one.

Another feature includes special typing characters that are descriptive of the items to be recorded as the typing of a "C" for credit in front of the credit item. The typing of the "C" automatically and selectively establishes connections to the registers, so that the credit register will become effective to register the credit item while other registers will be automatically rendered ineffective to compute before the typing of the item. In thus cutting out certain registers before the typing of the item, the numeral-keys are relieved of the useless operation of setting up a plurality of digit-selecting members which heretofore were eliminated, one by one, after the typing of the item and before the actuation of the general operator. Hence the touch of the computing keys will be correspondingly lightened for the operator's fingers, and the operator will be relieved of all responsibility for incorrectly synchronizing two or more register-controlling manipulations with a typing movement descriptive of a computation to be registered.

Another feature provides that in typing a significant character, the field of the inking ribbon will be automatically shifted to correspond to the computative character of the item to be registered.

Other features and advantages will hereinafter appear.

In the accompanying drawings,

Figure 1 is a side elevation, in section, of a combined typewriting and computing machine, showing only such parts as are essential to understand the invention.

Figure 2 is a chart illustrating one form of work-sheet, such as a post-card bill so commonly employed by utility corporations.

Figure 3 is a skeleton view, in perspective, of a carriage-controlled series of jacks with key-controlled means for rendering each series of jacks operative and inoperative to compute.

Figure 4 is a diagrammatic view of the connecting parts of the general operator to the carriage-tappet, showing the effect of the general operator in restoring these parts.

Figure 5 is a diagrammatic setting of the parts, as when the credit key is depressed to type a "C", and the computing mechanism is set and locked in a computive state before the numerals are typed for a red subtraction.

Figure 6 is a rear elevation, showing the fragmentary parts between the key-actuating bails and the subtractive control of the computing mechanism.

Numeral-keys and alphabet-keys 11 depress key-levers 12 to swing bell-cranks 13 fulcrumed at 14 to swing type-bars 15 upwardly and rearwardly to strike the front of a platen 16 mounted to rotate with a shaft 17 supported on the carriage-ends 18 of a carriage 19 traveling upon rails 20 when drawn by the carriage-motor, not shown. Each type-bar 15 is formed with means to engage a curved universal bar 21 forming part of a frame 22 and operative to vibrate an escapement-rocker 23 to vibrate dogs 24 thereon in and out of co-operation with teeth of an escapement-wheel 25, carrying a pinion 26 in train with a carriage-rack 27. The universal-bar frame 22 is operatively connected to vibrate a ribbon-vibrator 28 and a ribbon-carrier 29 operative to present a ribbon 30 to cover the typing line of the platen 16.

The carriage is also provided with tabulating mechanism operative to release the rack 27 from the pinion 26 and then arrest the carriage at a decimal position, which includes a series of denominational keys 31 to operate levers 32 connected at the rear ends to lift denominational stops 33 into the path of column-stops 34 adjustably mounted upon a stop-bar 35 secured at each carriage-end 18.

Each numeral-key 10, except the zero key, carries a pendant 36 operative to vibrate a crank-arm 37 to rock a shaft 38 to actuate a parallel linkage 39, there being an arm, shaft and linkage for each pendant 36. Each linkage is operative to depress index-pins 40 having the same digital value as the depressed numeral-key, and the pins 40 are disposed along denominational bars 41 that are moved seriatim into active positions relative to the linkages 39, by transposition devices 42 vibrated by levers 43 having their outer ends connected by rods 44 with jacks 45 arranged in groups to be vibrated by a tappet 46 carried by a dog 47 adjustably set in a column position along bars 48 and 49 supported by the carriage-ends 18. The effect of the tappet 46 in letter-spacing under the jacks 45 is to vibrate a pin-bar 41 at each letter-space position within a computing zone, and align pins 40 thereon under the linkages to be depressed when typing the numerals.

After each numeral is typed and indexed upon a pin-bar 41, a general operator 50 is operated by hand or by a motor-driven connection 51 to actuate a cross-bar 52, which picks up those pin-bars 41 having depressed pins 40 projecting therethrough, and, through a rack-section 53, conveys the set-up digital values of the pin-bars to the register-wheels 54. The motor and connections for driving the general operator 50 are fully described in the patent to Thornton, 1,146,371, dated July 13, 1915.

The subtraction-setting means includes a subtraction-key 55 secured to the front end of a push-bar 56 having a rear connection to an arm 57 fixed to a shaft 58, which shaft when rocked by the depression of the subtraction-key swings a hook 60, carried by the shaft, out of the holding notch formed in the lower edge of a subtraction-bar 59. The withdrawal of the hook 60 releases the subtraction-setting bar 59 to the action of a spring 61, and in thus shifting the bar rearwardly operates through a pin-and-slot connection 62 to vibrate a crank-arm 63 to rock a shaft 64 to vibrate an arm 65 connected to vibrate a universal bar 66, engaging slots, in all the shafts 38 to shift said shafts and associated linkages 39 to set up the complementary values of the keys depressed, as fully described in the patent to Hanson, 1,278,812, dated September 10, 1918.

Operation of the subtraction key causes a cam-arm 67 to move to a position under a pendant 68. The latter depends from a ribbon-controlling shaft 69. When shaft 69 is rocked by cams 67 and pendant 68 the active ribbon-field is shifted to red. Or when the computing mechanism is automatically set for subtraction by the carriage the column-stop will operate to vibrate a trip-lever 70, connected by a link 71 to a bell-crank 72 operative to withdraw a bar 73 normally underlying a lever-arm 74. The arm 74 forms one arm of a three-armed bell-crank pivotally mounted upon the shaft 58, the arm 74 being normally spring-pressed against the projecting end of the bar 73 by a spring 75 connected to an upright arm 76 of the bell-crank operative to rock the shaft 58 only through the turned-over edge 77 of a crank-arm 78 fast on the shaft 58, and rocks the shaft to release the bar 59 from the hook 60 when the arm 74 is released to the spring 75 upon withdrawal of the bar 73. A bell-crank arm 79 during the automatic subtraction-setting will be swung into the position of Figure 5 where the cross-bar 52 of the general operator will engage the cam-faces thereon to raise the arm 74 above the bar 73 and then engage a lug 80 on the subtraction-bar 59 to restore the bar. The automatic release of the bar 59 rocks the shaft 64 and vibrates an arm 81 thereon to raise a plunger 82 to engage the pendant 68 to shift the ribbon-field to red during the subtraction setting by the carriage-stop.

Means are also provided for silencing the computing mechanism by a non-add key 83 connected to the forward end of a link 85 communicating with the end of a long arm 86 of a bell-crank fulcrumed at 87 and formed with a short arm 88 to engage a short arm 89 mounted upon a rock-shaft 89ª to swing a spring-pressed frame 90 carrying a zone-controlling roller 91 clear of a follower roll 91ª on the dog 47, which allows the tappets 46 to drop below the jacks during the return of the carriage, as further described in the patent to Kupetz, 1,452,162, dated April 17, 1923.

In the above-described mechanism, which is the standard Underwood-Hanson construction, when it is desired to type net amounts, credits and arrears in the same column, but to carry individual totals for each item in separate registers, it is necessary to first type the item, which will set up conditions in all the registers, but to prevent the amount from entering all the registers, the error or elimination key of the registers, in which it is not desirable to enter the amounts, must be depressed to restore the mechanism set up for those registers, so that, if the credit amount is to be typed and run into a credit register the machine will be set to subtraction and the amounts typed, and then the elimination keys of both the net and arrears registers must be depressed, thereby allowing the typed amount to be run into the credit and crosstotal registers only. If the arrears amount were typed it would require the depression of the elimination key for both the credit and net registers. This places the operator under a constant strain, because of the extreme care required to avoid errors in depressing the wrong elimination key, which errors may take a long time to trace at the end of a day's typing.

Two extra keys 92 and 93, designated as "C" and "A" respectively, are mounted upon key-levers 94 positioned at the extreme side of the keyboard to fulcrum upon a standard wire 95 provided with a restoring spring 96 connected to vibrate a bell-crank 97 that is connected to a pivoted type-bar 98, each type-bar having a single type-face as "C" and "A".

Each key-lever 94, when depressed, besides projecting its type-bar 98 to type, engages and vibrates an underlying stud 99 secured to the lower arm 100 of each lever 101 that fulcrums upon a rod 102 common to both levers. The upper arm of each lever 101 is pivotally connected to a link 103 that extends rearwardly to have a pivotal connection with the lower ends of two crank-arms 104 and 105. The crank-arm 104 which is vibrated by the "C" key is secured to a rock-shaft 106 having end bearings in brackets 107 at each side of the machine, and spring-rocked in a clockwise direction by a spring 108 coiled about the shaft at any convenient position. The shaft 106 supports three frames or bails 109, 110 and 111, each frame taking the form of an inverted U with guide-holes therein to receive the free upper ends of the push-rods 44, one bail for each set of rods and for each set of jacks 45. The swinging of the bails carries a set of rods to or from their respective sets of jacks and controls the transmission of motion from the jacks to the pin-bars 41. As shown at Figure 3, the bail 111 is free to swing upon the shaft 106, and its set of rods 44 is normally withdrawn from the set of jacks 45 associated with the credit register, under the tension of a spring 108. To control the swinging movement of the bail 111, a crank-arm 112 fast to the shaft 106 is formed with a round nose to engage the bifurcated end of a sub-lever 113 fulcrumed upon a screw 114 threaded into the bracket 107 and operative through the tension of the spring 108 to press the sub-lever 113 against the part 115 of the bail 111 to establish a normal stop position for the bail. When the shaft 106 is rotated in a clockwise direction by the depression of the "C" key, the crank-arm 112 will rock the sub-lever 113, which will rock the bail 111 in a direction reverse to the shaft and swing the rods 44 thereon under the ends of jacks 45 of the credit register.

As already explained the net register is normally operative, hence the bail 110 associated with the net-register jacks, normally holds the rods 44 in operative position under the jacks. The bail 110 is loose upon the shaft 106 and held against a stop-arm 116 fast to the shaft by a spring 117 normally forcing the bail towards the jacks. When the shaft 106 is rocked to swing the bail 111 towards the credit jacks, the arm 116 has swung the bail 110 in a reverse direction away from the net jacks to prevent the joint actuation of the credit and net registers.

To render the arrears register operable independently of both net and credit registers, the two arms of the bail 109 are loose upon a sleeve 118, and said sleeve is loose upon the shaft 106. The sleeve 118 carries the crank-arm 105 secured to one end thereof, and an arm 112ª secured to the sleeve that operates to vibrate the sub-lever 113 which normally bears against the part 119 of the bail 109. Bail 109 is spring-pressed away from the jacks by a spring 120 coiled about the sleeve 118. The sleeve 118 extends along the shaft to the bail 110 where the free end carries a crank-arm 121 having a turned-over stop face 122 for the bail 110. When the "A" key is depressed the non-rocking of the shaft 106 leaves the bail 111 inoperative, but the rocking of the sleeve 118 around the stationary shaft causes the bail 109 to swing towards the arrears jacks, and simultaneously swings the bail 110 away from the set of net jacks.

Each lever 101 has pivoted thereto a latch 123 operative when said lever is drawn forward by the action of its depressed key to latch under a cross-rod 124 under the influence of a spring 127 to hold the active stud 99 of the levers 101 depressed during the pin-setting movement, but during the cycling of the machine the latch 123 is released, and the displaced bails are restored. To this end, the initial operation of the general operator 50 causes a slot 50ª thereon to cam a bell-crank 125 positioned to abut and vibrate an arm 126 pendent from the link 85, and thereby shift the zone-determining roller 91 to the inoperative position shown at Figure 4.

The frame 90 of the zone-roller 91 includes an arm 90ª having a link 128 suspended therefrom and connected to a crank-arm 129 secured to a rock-shaft 130 carrying the universal bar operated by the denominational stops 33 in the well-known Underwood manner (Becker Patent 1,296,355, Figure 8). As this link 128 is vibrated at every cycle of the general operator, connections are made with said link operative to release the latches 123 to release the key-set bails 109, 110 and 111. To this end, a frame 131 is mounted to vibrate on the cross-rod 124 and includes an arm 132 having a pin-and-slot connection 133, and, through the link 128, a universal bar 134 for the two latches. When the link 128 is raised by the action of the general operator, the frame 131, vibrated thereby, separates the latch 123 from the rod 124, and releases the key-actuated bails 109, 110 or 111 to be restored to their normal positions during the cycling of the machine. The two rods 102 and 124 may be supported by brackets 135 secured to the rear wall of the frame.

The rock-shaft 106 has secured thereto an arm 136, projecting forwardly to underlie the end of the lever 70. When the arrears key is depressed, two bails 109 and 110 are reversely vibrated by the sleeve 118, and, as the shaft 106 is stationary, the arm 136 does not vibrate the lever 70, and the computive state of the machine remains for addition. When the credit-key is depressed the shaft 106 is rocked to reversely vibrate the two bails 110 and 111, but the rocking of the shaft 106, to render the set of credit jacks operative, rocks the arm 136 to raise the lever 70, and through the intermediate connections effects the release of the subtraction-bar 59 to set the machine subtractively.

The employment of means for automatically establishing register connections for typed entries by first typing the character that is descriptive of that entry, provides that the net, credit, arrears, or other classified entries may be successively accumulated one by one by a register for a grand total of each class of entries and without any selective manipulations on the part of the operator, except in operating a key for typing a significant character for the items to be entered, and avoids the possibility of errors in distributing the items to their respective registers.

It will be seen at Figure 2 that a postcard 138 overlies a record-sheet 137 with a carbon-inlay 139. The post-card is divided into two sections separated by a perforated line, the right-hand section 140 forming a checking stub which is retained by the office when the consumer pays his bill. The items typed upon the stub 140 are duplicates of the net items typed upon the post-card, and may be typed as a separate operation to clear the net-total register. The record-sheet 137 carries many public utility records that are not typed upon the post-card, but the card-records are manifolded to the record-sheet for a permanent office-record. As the stub-end entries are duplicates of the postal entries these stub entries are not manifolded to the record-sheet 137, because the carbon-inlay 139 ends at the line that divides the stub from the post-card.

In typing the single line on each post-card the typing of "550" under "present reading" runs the amount additively into the register 141; the typing of the "past" or last reading as "535" runs this amount into the same register subtractively, and the difference of "15" is disclosed by this register; in typing the "15" in the "consumption" column, the register 141 is cleared in a well-known manner.

When the net amount 1 80 is typed, this item will be run into both the "net" or primary register 142, and the "cross-total" register 143, because it will be remembered that the register 143 accumulates all items, and the register 142 is normally set for computing. The next entry under the "net" column is an arrears item of 2 00 to be tabulated as A 2 00 under the 1 80. The depression of the arrears key 93 to type the "A" rocks the sleeve 118 to withdraw the bail 110 and silence the register 142, and swing the bail 109 into operative relation with the jacks for the register 144. In typing the 2 00, this amount is set up to be simultaneously run into two registers 144 and 143 additively by the general operator which then releases the locked arrears bail 109, and the bail 110 is restored to its normal position relative to the "net" register.

The next item to be typed within the "net" column is a credit amount of "1 00." The depression of the credit key 92 to type a "C" rocks the shaft 106 to vibrate the bail 110 outwardly to silence the net register 142 and vibrate the bail 111 inwardly to render the credit register 145 effective to compute, as a substitute for 142. The rocking of the shaft 106 swings the arm 136 to raise the lever 70, and through the connections previously described the subtraction-bar 59 is released to set the machine for subtraction and to shift the ribbon for a red field. Hence when the amount C 1 00 is typed upon the card in red, the amount is run into the register 145 having reverse dials for a direct reading of 1 00, and the amount simultaneously subtracted from the total of the cross-total register 143, which register exhibits a net amount of 2 80 after the machine has been cycled by the general operator.

Instead of clearing this total 2 80 from the register 143 when the same is typed within the net column, the non-add key is operated, to prevent the clearance of any of the registers. When the net-column entries and footing are completed the register 141 stands at zero, the credit register 145 shows 1 00, the net register 142 shows 1 80, the arrears register 144 shows 2 00, and the cross-total register 143 shows 2 80.

The card and record-sheet may now be turned backward to re-register the first typed-line entry to the typing line of the platen, and column-spaced to establish a column area upon the postal stub 140. The net entry to be typed upon the first line of the stub may be read from the entry already typed upon the post-card or read from the net register 142. The non-add or elimination key permanently cuts out the cross-total register 143 during the typing of the three net items on the postal stub and the total 2 80 registered therein remains undisturbed. The depression of the subtraction-key provides for a red-subtraction record, but, as a black-record is desirable the usual black shift-key 146 is held depressed until the 1 80 is typed in black upon the stub 140, when the general operator clears the net register 142.

Typing of the second-line entry upon the stub 140 is similar to that described for the first entry, except that the "A" key 93 types an A and selectively sets the bail 109 to compute and renders the bail 110 inoperative to compute. The computing mechanism is conditioned by the depression of the subtraction-key for a red subtraction, but the black ribbon-field is restored by the ribbon shift-key before typing the item, and the general operator, after the typing of the item, clears the substitutive register 144.

In typing the third-line entry upon the stub the "C" key 92 types the "C" and selectively shifts the bail 111 into a computive position and renders the rods of the bail 110 inoperative to compute. As this credit entry of 1 00 typed upon the post-card is entered subtractively into the register 145 having reversed numerals, the register will be cleared additively, and the ribbon manually shifted for a red addition. Hence the typing of the C 1 00 on the stub clears the register 145.

The four registers 141, 142, 144 and 145 now stand at zero, but the register 143 still shows the final total 2 80, and this register may now be released from the control of the non-add key. In typing the total amount on the stub 140 all the registers except 143 are eliminated, and the register 143 is conditioned for subtraction, and after typing of the total 2 80 upon the stub the general operator clears the register 143. The typed post-card is now removed and replaced by a new card, each card-record being successively manifolded upon the record-sheet 137.

The above operation is only one example of the utility of this invention, and many other forms of billing may be advantageously employed, as, for example, the three registers 142, 144 and 145 may be employed to successively register similar items for grand totals at the end of a typing period, instead of being cleared after the typing of each bill.

The automatic elimination of certain registers, predetermined by the manipulation of a typing key descriptive of the character of the item to be typed and registered, relieves the operator of much mental strain, and especially prevents the misregistration of dissimilar items typed and tabulated one under the other in the same column.

It will be noted that the depression of a typing key effects the letter spacing of the carriage to a computing zone and simultaneously renders the computing mechanism operative to compute within the zone; and that the depression of the typing key selectively renders the computing mechanism operative to compute, simultaneously actuates the subtraction-setting devices, and changes the field of the ribbon for typing according to the computive state of the machine.

Variations may be resorted to within the scope of the invention, and portions of the improvements may be used without others.

Having thus described my invention, I claim:

1. In a combined typewriting and computing machine, the combination of a computing mechanism normally inoperative, a key-actuated mechanism operable to type a distinguishing proof character before a computation, and further operable to condition the computing mechanism for a computation according to the computative significance of the character typed, means operable by the key and effective to hold the key-conditioned computing mechanism throughout a computing interval, and means operable to release the computing mechanism at the end of the computing interval.

2. In a combined typewriting and computing machine, the combination with a traveling carriage, a computing mechanism rendered normally inoperative by a set of rods disconnected from a set of jacks engageable seriatim by a tappet on the carriage, and a general operator, of means to render the computing mechanism operative, said means including a key having connections operable to type, and also having connections operable to shift the set of disconnected rods into cooperation with the set of jacks to render the computing mechanism operative to compute, means actuated by the key to effect the locking of the rods in their operative position during the travel of the carriage in computing, and means operated by the general operator at the end of the computation effective to release the locked rods to be restored to their normal positions.

3. In a combined typewriting and computing machine, the combination with a traveling carriage to actuate sets of jacks for computing, a set of rods to be operated by each set of jacks to establish computative connections with a register, a carrier for each set of rods operable to connect or disconnect the rods from their jacks, and typing mechanism including a key-lever, of a shaft to support and control the rod-carriers, a train of connections between the key-lever and the shaft operative to rock the shaft to swing the carriers and render the rods operative or inoperative to their jacks, and releasable means for maintaining the rod-carriers in the positions to which they are set by the type-key lever.

4. In a combined typewriting and computing machine, the combination with a carriage, a carriage-actuated set of jacks, a computing mechanism having a pair of registers, a set of rods connecting the jacks with the computing mechanism to render one register operative, a second set of jacks, a second set of rods connected with the computing mechanism but disconnected from the second set of jacks to render the other register inoperative, a carrier for the ends of each set of rods to guide the rods relatively to their jacks, a special key-lever having a type operative to type a proof character before a computation, of means operable by the key-lever to operate both carriers to readjust the positions of their rods to their jacks to silence one register and render the other register operative, means for holding the two sets of rods in their readjusted positions during a computing interval while the special type-key lever returns to normal position, and means to enable said special key-lever to set the machine for subtraction.

5. In a combined typewriting and computing machine, the combination with a carriage, a carriage-actuated set of jacks, a computing mechanism having a pair of registers, a set of rods connecting the jacks with the computing mechanism to render one register operative, a second set of jacks, a second set of rods connected with the computing mechanism but disconnected from the second set of jacks to render the other register inoperative, a carrier for the ends of each set of rods to guide the rods relatively to their jacks, and a key operative to type a character, of means operable by the key whereby the typing of a character will operate both carriers to readjust the positions of their rods to their jacks to silence one register and render the other register operative, means for holding the two sets of rods in their readjusted positions during a computing interval, means enabling the key and its typing element to be restored to normal positions after the readjustment of the rods, and means to restore the readjusted rods to their normal positions at the end of the computing interval and independently of the key.

6. In a combined typewriting and computing machine, the combination with a plurality of groups of carriage-actuated jacks, a plurality of sets of rods, one set of rods for each group of jacks, each set of rods operative to convey motion from a group of jacks to a computing mechanism, a separate carrier for each set of rods operative to guide the ends thereof into and out of contact with their series of jacks, and a key-lever operable to print a proving character before a computation, of means whereby the key-lever in printing a character will operate said carriers to simultaneously disconnect one set of rods from one set of jacks and connect another set of rods with the other set of jacks prior to a computing operation, and releasable means for maintaining the connection of the connected set of rods.

7. In a combined typewriting and computing machine, the combination with carriage-actuated jacks, rods operative to convey motion from the jacks to a computing mechanism, a carrier to guide the ends of the rods into and out of contact with the jacks, and a key-lever operable to print a proving character before a computation and having connections to control the carrier, of self-locking means whereby the key-lever in printing will operate mechanism effective to hold said carrier at a position to connect the rods with the jacks prior to a computing operation and after the release of the key-lever.

8. In a combined typewriting and computing machine having a plurality of groups of carriage-actuated jacks, a plurality of sets of rods, one set connectible with each group of jacks and each set connected with a computing mechanism, the combination of a carrier for each set of rods operative to guide the ends thereof into and out of connection with their jacks, keys to print respective distinguishing proof characters before a computation, means to enable each key to control a different carrier from the other key, means to enable said keys to control a primary carrier in common, including a shaft to control certain carriers and a sleeve on the shaft independently operative to control other carriers, one of the carriers being controlled by either the shaft or the sleeve, a train of connections with one key operative to rock the shaft, train of connections with the other key to rock the sleeve independently of the shaft, both trains of connections having a one-way driving connection with their keys, either key being individually restorable after the typing of its character, independently of the carriers, means to detain the carriers where set, and means for automatically restoring the carriers to original condition.

9. In a combined typewriting and computing machine, the combination with a traveling carriage, carriage-actuated denomination-selecting means including a plurality of sets of jacks, and a plurality of sets of rods operable by the jacks, of a rod-controlling carrier for each set of rods and effective to render each set of rods operative and inoperative with their jacks (a key-lever operable to print a distinguishing computative proving character before a computation, mechanism operated by the key-lever and operatively connected to the rod-controlling carriers to connect one set of rods with one set of jacks and disconnect another set of rods from another set of jacks, and releasable means for maintaining the connection of the connected set of jacks.

10. In a combined typewriting and computing machine, the combination with a printing mechanism including a key and a type having a distinguishing proving character indicating a subtraction, and a computing mechanism normally inoperative and having a normally-inoperative subtraction-setting device, of mechanism rendered effective by the depression of the key in printing the character before a computation and effective to render the computing mechanism operative to subsequently compute subtractively.

11. In a combined typewriting and registering mechanism having numeral-type-keys, an indexing mechanism operable by said keys, and means for setting the mechanism to subtraction, the combination of a special type for printing a character indicative of subtraction, a key for driving said special type, means connected to said special key to operate said subtraction-setting means preparatory to the manipulation of the numeral-type-keys after the special type and key have returned to normal positions, said special key and type being returnable to normal positions independently of the subtraction-setting means, means for mechanically detaining the subtraction-setting means in effective position, and means for automatically restoring the mechanism to addition independently of said special key, preparatory to typing another amount in the same column and entering it in the register.

12. In a combined typewriting and registering machine having numeral-types, keys therefor, a plurality of registers, and an indexing mechanism controlled by said keys, said indexing mechanism including connections, the combination with means for rendering the connections for the first of said registers normally effective, and for holding the connections for the second of said registers normally ineffective, a special type for printing a character to indicate the employment of the second register, a special key for operating said type, means operated by said special key for rendering ineffective the indexing connections of the first register and concomitantly rendering effective the indexing connections of the second register, means for automatically detaining said indexing connections, to permit independent return to normal position of said special type preparatory to the typing and registering of a number in the second register, and means for thereafter automatically restoring said indexing connections to their original condition.

13. In a combined typewriting and registering machine, the combination with a traveling carriage and a registering set of rods disconnected from a set of jacks engageable seriatim by a tappet on the carriage, of means to render the set of rods effective, said means including a key having a type-connection operable to print, and also having connections operable to shift the set of disconnected rods into co-operation with the set of jacks to render the registering set of rods operative, and means actuated by the key to effect the locking of the rods in their operative position during the travel of the carriage-tappet in registering, the key and its type being returnable to normal positions independently and in advance of the locking means.

14. In a combined typewriting and registering machine, the combination with a carriage and sets of indexing jacks operable by the carriage, of sets of rods to be operated by the sets of jacks, primary and substitutive registers controllable by said carriage through said jacks and rods, a plurality of carriers, one for each set of rods, operable to connect and disconnect the rods from their jacks, a shaft whereon said carriers are loosely assembled, the primary register rods being normally in effective position, and the substitutive sets of rods being normally disconnected from their jacks, a proof-type operating key connected to said shaft to rock it, means upon said shaft to disconnect the primary rods, means operated by said shaft to move one of the carriers to connect a substitutive set of rods, a second proof-type operating key, means including a second shaft and operable by said second key to disconnect the primary set of rods, and means also operable by said second shaft to connect a second set of substitutive rods to their jacks while the rods of the primary set remain disconnected.

15. In a combined typewriting and registering machine, the combination with a carriage and sets of indexing jacks operable by the carriage, of sets of rods to be operated by the sets of jacks, primary and substitutive registers controllable by said carriage through said jacks and rods, a plurality of carriers, one for each set of rods, operable to connect and disconnect the rods from their jacks, a shaft whereon said carriers are loosely assembled, the primary register rods being normally in effective position, and the substitutive sets of rods being normally disconnected from their jacks, a key connected to said shaft to rock it, means upon said shaft to disconnect the primary rods, means operated by said shaft to move one of the carriers to connect a substitutive set of rods, a second key, means including a second shaft and operable by said second key to disconnect the primary set of rods, means also operable by said second shaft to connect a second set of substitutive rods to their jacks while the rods of the primary set remain disconnected, whereby amounts typed in a column are normally entered in the primary register, but by the selective operation of one of the keys may be exclusively entered in one of the substitutive registers, types operable by the keys to indicate the substitutive registers in which amounts are entered, means mechanically detaining any carrier in the position to which it is set by its key, the types being returnable to normal positions independently of said carriers, and means for automatically restoring primary and substitutive carriers to initial condition upon the conclusion of the registration of an amount.

16. In a combined typewriting and registering machine, the combination with three groups of carriage-actuated jacks, of three sets of rods, one set of rods for each group of jacks, each set of rods operative to transmit motion from a group of jacks to a computing mechanism, the latter having three registers, a separate carrier for each set of rods operative to guide the ends thereof into and out of connection with their group of jacks, and two key-levers, each lever having means to print a special character before a computation, means whereby either key-lever in typing a character will simultaneously operate one carrier to control the relation of its set of rods to its group of jacks, each key also having means to control the relation of the remaining set of rods to their jacks, and releasable means to maintain the rods at the positions to which they are set by the keys.

17. In a combined typewriting and registering machine having means whereby amounts may be typed in one column, the combination with a primary register normally effective for registering the amounts typed in such column, of a plurality of substitutive registers, a plurality of special types for proving the use in said column of said substitutive registers respectively, keys for said special types, means settable by said special type-keys selectively for (1) causing any amount typed in said column to be entered in the substitutive register corresponding with the selected key and (2) concomitantly preventing said amount from being entered in the primary register, and releasable means for maintaining the settable means in effective positions.

18. In a combined typewriting and registering machine having means whereby amounts may be typed in one column, the combination with a primary register normally effective for adding the amounts typed in such column, of a plurality of substitutive registers, a plurality of special types for proving the use in said column of said substitutive registers respectively, keys for said special types, means settable by said special type-keys selectively for (1) causing any amount typed in said column to be entered in the substitutive register corresponding with the selected key and (2) concomitantly preventing said amount from being entered in the primary register, releasable means for maintaining the settable means in effective positions and an accumulative register wherein all amounts are automatically entered which are entered in said primary and substitutive registers, means being operable by one of said special type-keys to condition the primary register and the accumulative register for subtraction.

19. In a combined typewriting and registering machine having a plurality of registers, numeral-type-keys, indexing mechanism controlled by the keys for said registers, and a general operator for cycling the registers, the indexing mechanism being normally connected for setting up a number for the first of said registers, the combination with means for holding the indexing mechanism for the second of said registers normally disconnected, of a special key, a special proving type operated thereby, means settable by said special key for disabling the indexing mechanism for the first totalizer and rendering the indexing mechanism for the second totalizer effective, releasable means for maintaining the settable means in effective positions, and means for automatically restoring the indexing mechanisms to normal conditions.

20. In a combined typewriting and registering machine, the combination with a carriage and sets of indexing jacks operable by the carriage, of sets of rods to be operated by the sets of jacks, primary and substitutive registers controllable by said carriage through said jacks and rods, a plurality of carriers, one for each set of rods, operable to connect and disconnect the rods from their jacks, a shaft whereon said carriers are loosely assembled, the primary register rods being normally in effective position, and the substitutive sets of rods being normally disconnected from their jacks, a key connected to said shaft to rock it, means upon said shaft to disconnect the primary rods, means operated by said shaft to move one of the carriers to connect a substitutive set of rods, a second key, means including a second shaft and operable by said second key to disconnect the primary set of rods, means also operable by said second shaft to connect a second set of substitutive rods to their jacks while the rods of the primary set remain disconnected, whereby amounts typed in a column are normally entered in the primary register, but by the selective operation of one of the keys may be exclusively entered in one of the substitutive registers, types operable by the keys to indicate the substitutive registers in which amounts are entered, and releasable means for maintaining the selected sets of rods at the positions to which they are set by the keys.

21. In a combined typewriting and registering machine, the combination with three groups of carriage-actuated jacks, of three sets of rods, one set of rods for each group of jacks, each set of rods operative to transmit motion from a group of jacks to a computing mechanism, the latter having three registers, a separate carrier for each set of rods operative to guide the ends thereof into and out of connection with their group of jacks, and two key-levers, each lever having means to print a special proving character before a computation, and means whereby either key-lever in typing a character will simultaneously operate one carrier to control the relation of its set of rods to its group of jacks, each key also having means to control the relation of the remaining set of rods to their jacks, said controlling means including a shaft operable by one key, for controlling one group of rods, a sleeve on the shaft operable by the other key for controlling another group of rods, and means operated by either the shaft or the sleeve for controlling the remaining group of rods, means being provided to detain either the shaft or the sleeve independently in effective position, to permit return of the type to normal position.

22. In a combined typewriting and computing machine, the combination with a traveling carriage and a computing set of rods disconnected from a set of jacks engageable seriatim by a tappet on the carriage, of means to render the set of rods effective, said means including a key having connections operable to print a proving character descriptive of a computation, and having other connections operable to shift the set of disconnected rods into co-operation with the set of jacks, and releasable means for holding the set of rods in effective position.

23. In a combined typewriting and computing machine, the combination with a plurality of groups of carriage-actuated jacks, a plurality of sets of rods, each set operative to convey motion from a group of jacks to a computing mechanism, a separate carrier for each set of rods operative to guide the ends thereof into and out of contact with their series of jacks, and a key-lever operable to type a proof character before a computation, of means whereby the key in printing a character will operate said carriers and disconnect one set of rods from one set of jacks and connect another set of rods with another set of jacks before a computing operation, and releasable means for maintaining the connection of the connected set of rods.

24. In a combined typewriting and computing machine having a computing mechanism and a normally inoperative register, the combination of a key, means settable by said key for rendering said register operative, releasable means for maintaining said settable means in effective position, a mechanism operated by the key to type a proving character before computation, and means controlled by said key for shifting the computing mechanism to a subtractive state, said character being significant of the operative condition of said register and also of its subtractive state.

25. In a combined typewriting and computing machine, the combination of a plurality of registering mechanisms, numeral-type-keys normally inoperative to control said registering mechanisms, a plurality of special keys, mechanisms operable selectively by said special keys to type distinguishing character preparatory to the typing and registering of an amount, each character-type denoting the register selected by its key and also denoting the condition of the selected register, means to enable the special keys to select and also condition the registering mechanisms as indicated by the special character typed, means settable by each special key to maintain its registering mechanism selected and conditioned throughout a computing operation after the return of the special key and type, said special keys with their types returning automatically to normal positions while said maintaining means are effective, preparatory to the typing and entering of the amount in the selected manner into the selected register, and means operable to release the registering mechanism at the conclusion of the registering operation.

26. In a combined typewriting and computing machine, the combination with three registers, of two keys, each operating an individual proof type, means to enable one of said keys to select one of said registers and print the type therefor, means to enable the other of said keys to select the other of said registers and print the type therefor, and means to enable each key to control the remaining register.

27. In a combined typewriting and computing machine, the combination with three registers, of two keys, means to enable one of said keys to select one of said registers, means to enable the other of said keys to select the other of said registers, means to enable each key to control the remaining register, each of said keys having an individual proof-printing type, operable in advance of computation, and releasable means to maintain the selection effected by either key.

28. In a combined typewriting and computing machine, the combination with three registers, of two keys, means to enable one of said keys to select one of said registers, means to enable another of said keys to select the other of said registers, means to enable each key to control the remaining register, each of said keys having an individual proof-printing type, operable in advance of computation, and releasable means to maintain the selection effected by either key, said machine being shiftable by one of said keys from addition to subtraction, and the type selected by each of said keys proving the correct selection of a register, and also proving the state of the selected register.

29. In a combined typewriting and computing machine normally in condition for addition and having a plurality of registers and subtraction-mechanism, keys, means for enabling one of said keys to select one of said registers, a type connected to said key to print upon the work-sheet a sign proving the correct selection of the register and also proving it to be in condition for addition, and means for enabling another of said keys to set the machine for subtraction and to select another register, the last-mentioned key having means to print an individual type upon the work-sheet to prove the correct selection of the register, and also to prove that the machine is set for subtraction, and releasable means for maintaining the selections of the registers, to permit the return of the keys to normal positions.

30. The combination of three primary registers, a key for selecting one of said primary registers, a type controlled by said key for printing upon the work-sheet a character to prove the correct selection of the primary register, a second key connected to select the second primary register and controlling the entry of an amount therein which is typed upon the work-sheet in the same column with the first amount, a type controlled by said second key for proving the correct selection of the second register, releasable means for maintaining the selections of the registers, third primary register being normally operative, means for enabling each of said keys to silence said third primary register, whereby amounts may be written in a single column one under another but entered in different registers which are proven upon the work-sheet, and a cross-computing register for said three registers, whereby the net result of the amounts typed in said single column may be ascertained.

31. In a combined typewriting and computing machine, the combination with a traveling typewriter-carriage, a key, and a computing mechanism including a plurality of registers, each register having a set of operating computing rods, a set of jacks engageable with the rods, and a tappet on the carriage to operate all the jacks, of mechanism to render any set of rods effective or ineffective by shifting the rods relatively to their set of jacks, said mechanism including a key-actuated, proof-typing mechanism having connections operative in printing a character before a computation to predetermine which set of rods shall be connected with the set of jacks to register a computation indicated by the character printed, and releasable means for maintaining the connection of the rods when the proof-type key returns to normal position.

HENRY RESCH.